W. C. BRINTON, Jr.
ELECTRICAL CONDENSER.
APPLICATION FILED OCT. 8, 1918.
1,393,077. Patented Oct. 11, 1921.
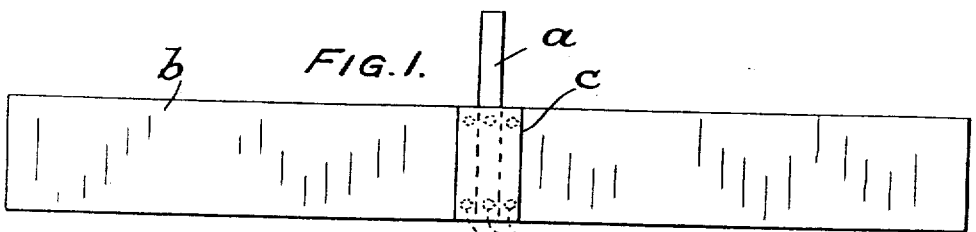
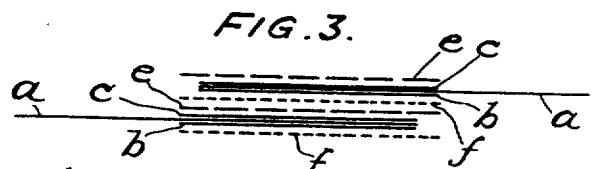
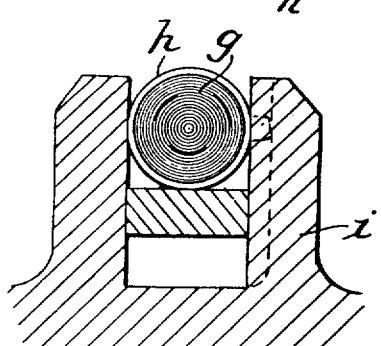
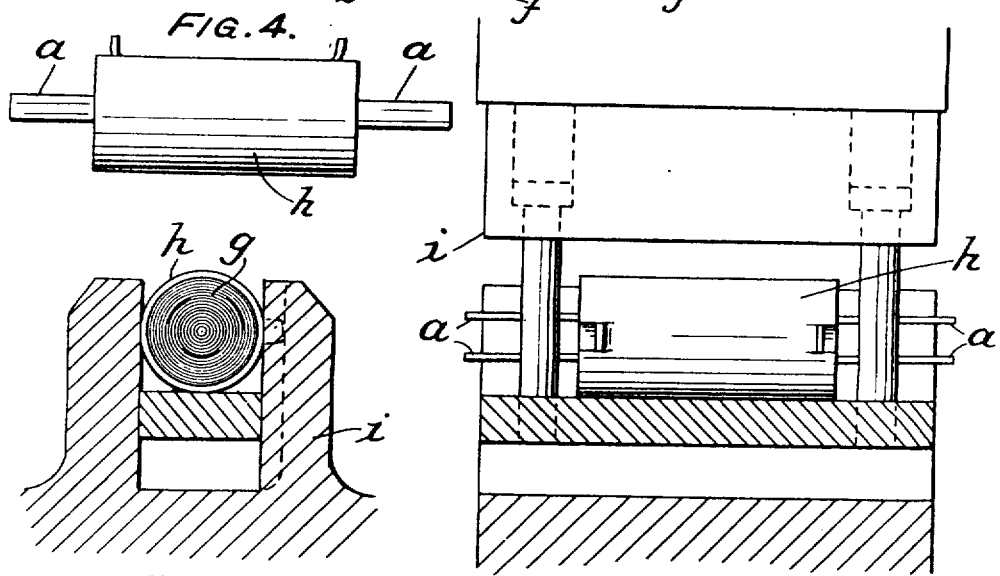
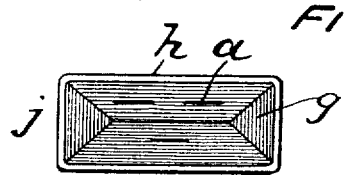
WITNESS:
Rob. R. Kitchel
INVENTOR
William C. Brinton, Jr.
BY
Frank S. Busser
ATTORNEY.

UNITED STATES PATENT OFFICE.

WILLIAM C. BRINTON, JR., OF KENNETT SQUARE, PENNSYLVANIA, ASSIGNOR, BY MESNE ASSIGNMENTS, TO PHILBRIN CORPORATION, OF KENNETT SQUARE, PENNSYLVANIA, A CORPORATION OF DELAWARE.

ELECTRICAL CONDENSER.

1,393,077.  Specification of Letters Patent.  Patented Oct. 11, 1921.

Application filed October 8, 1918. Serial No. 257,419.

*To all whom it may concern:*

Be it known that I, WILLIAM C. BRINTON, Jr., a citizen of the United States, residing at Kennett Square, county of Chester, and State of Pennsylvania, have invented a new and useful Improvement in Electric Condensers, of which the following is a full, clear, and exact description, reference being had to the accompanying drawings, which form a part of this specification.

The object of my invention is to provide a new and improved construction for electrical condensers, which will be at the same time simple and economical and will give condensers of uniformly high efficiency.

The primary desiderata in the present type of condensers are the effectual elimination of moisture and the reduction as far as possible of the tendency of the condenser to "store," that is, to fail to completely discharge. These objects are sought to be obtained in condensers as usually constructed by impregnating with wax or other material and by pressing the layers of dielectric and conducting material forming the condenser tightly together.

I have found that the materials heretofore used in building up condensers strongly resist pressure and if subjected to a pressure sufficiently great to give the degree of compression desired tend to rupture, rendering the condenser valueless. On the other hand, if care is taken to avoid rupturing, the degree of compression is so limited that considerable amounts of impregnating material must be used to prevent the entrance of moisture and the condenser has a considerable tendency to store. The material heretofore used is rendered brittle by heat and the condensers are frequently ruined when impregnated with the wax.

I have found, further, that if the dielectric material is composed of hard paper, the condenser is difficult to compress, the paper is readily ruptured, the paper is incapable of withstanding a high temperature, and the condenser can not be compressed into a true rectangular form in cross-section, the completed condenser tending to assume a convex shape on each face thereof exposed to the pressure of the dies. On the other hand, while a dielectric material composed of soft paper withstands a higher temperature and is more compressible, it, also, tends to rupture and the condenser, when compressed, tends to assume a concave face top and bottom.

The above evils are all entirely overcome in a condenser constructed in accordance with my invention. The principal feature of my improved condenser is the use, as a dielectric material, of a plurality of plies of paper which have substantially different degrees of hardness, compressibility and weight. As heretofore, two plies of paper are preferably used to separate adjacent layers of conducting material; but in such preferred embodiment of my invention, these two contiguous plies are composed of a relatively heavy, hard and non-compressible paper and a relatively light, soft and compressible paper. It has been found that with such a construction and arrangement of dielectric material, the condenser may be subjected to a degree of compression hitherto deemed impracticable without danger of rupture; the paper is capable of withstanding a temperature equal to that which a soft paper alone will withstand; the condenser assumes a true rectangular form conforming to the shape of the dies; the amount of wax required for impregnation is reduced to a minimum; moisture is effectually excluded from the compressed and impregnated condenser; and the tendency to "store" is practically overcome.

A preferred embodiment of my invention is shown in the accompanying drawings, in which:—

Figure 1 is a plan view of a partly manufactured condenser with a lead attached.

Fig. 2 is an edge view of the same, two layers of conducting material and one complete double-ply layer of dielectric material being shown.

Fig. 3 is a cross-sectional view of the same.

Fig. 4 is a plan view of the condenser before being pressed into final shape.

Fig. 5 is a cross-section through the lower part of Fig. 6.

Fig. 6 is a sectional view of a press, with my condenser in place for pressing to final form.

Fig. 7 is a cross-sectional view of the completed condenser.

In the preferred way of constructing my improved condenser, I arrange alternate layers of dielectric and conducting material in a pile of long strips. The conducting material may be aluminum or other conducting foil, while each layer of dielectric material is composed of two layers or plies of paper of different degrees of hardness.

In building up the condenser, I connect the leads $a$ to the conducting foil $b$ by first fixing the lead to the foil with shellac and then covering the lead with a piece of varnished paper $c$, which I tack to the conducting material with shellac, as at the points $d$.

Upon each strip of foil $b$ I lay a strip of relatively hard and non-compressible paper $e$ and upon it a strip of relatively soft and compressible paper $f$, both sheets of paper being preferably of about the same thickness. I then lay another layer of foil, and then two strips of paper, one relatively hard and the other relatively soft, and so on until the desired thickness is attained.

When sufficient material has been laid down, I wind the strips on a mandrel, withdraw the cylindrical condenser body $g$ and insert it in a cylindrical metal case $h$. I then submit the whole to pressure in the hydraulic press $i$, applying sufficient pressure to give the complete condenser $j$ a rectangular shape.

I then impregnate the condenser with wax; for example, by the method described in my application for patent Serial No. 181,735, filed July 20, 1917.

The condenser body so constructed will have no tendency to rupture under pressure, and will not be injuriously affected by the heat of the wax. The soft paper, being able to withstand a greater pressure and heat than the hard paper alone, acts as a cushion to protect the hard paper and prevent injury to the condenser body. It has been found practicable to use a power press in the operation of consolidating and shaping the condenser, thus giving a more uniform and more highly compacted product.

I am aware that it has been proposed, in incased oil-bath-cooled condensers, to associate, with conducting material and very thin high insulating dielectric material, very thick porous material which, by reason of its bulk, is comparatively heavy, adapted to absorb oil from the bath in which the condenser is immersed, whereby the heat generated by the condenser is conducted away through the thick porous oil-holding layers to the surrounding body of oil. See German patents to Gormann, No. 196,531, March 25, 1908, and No. 200,444, July 13, 1908. My condenser, however, is of the type which may be distinguished by the term "dry" in that it is not immersed in an oil-bath and therefore it must be so constructed that the heat generated will be conducted to the surrounding atmosphere. An efficient condenser of this type requires a protective casing and the consolidation of the condenser by pressure to bring all the elements into intimate relation. See the patent issued to me August 14, 1917, No. 1,237,015. It is obvious that the use of thick porous filter paper or the like would enormously increase the size of the condenser and correspondingly lower its efficiency. It is also clear that an oil-holding porous mat would not effectively conduct away heat unless the condenser was oil bath-cooled. It is also obvious that if such a condenser were subject to high pressure, the oil-holding porous mat would be so substantially compressed and consolidated that the oil held thereby would be largely expelled from its interstices so that it would no longer perform its intended function. My invention excludes the employment of a thick oil-containing heat-dissipating dielectric, and is intended for purposes quite different from that intended or attained by the condensers of the German patents above named. It involves the employment of a casing and the subjection of the incased condenser to a pressure sufficient to closely consolidate the elements of the condenser into intimate relationship; and the described paper dielectrics of the differential characteristics described perform the functions of insuring the production of an incased condenser of true rectangular section, preventing the tendency of the condenser to store, avoiding rupture of the dielectric, enabling the condenser to withstand the high temperature incident to impregnation with wax, reducing the amount of wax required for impregnation, and making the condenser moisture-proof. To secure the desired efficiency, the relatively soft and compressible paper should be not merely much less dense but should also be of less weight than the relatively hard and incompressible paper, it being preferably of no greater thickness than the hard paper and consequently not adding to the bulk of an ordinary condenser employing, between the layers of conducting material, a double thickness of dielectric.

I am aware also that it has been proposed to build up a condenser of sheets of conducting material separated by juxtaposed sheets of bond paper, one paper sheet being varnished and the other coated or impregnated with wax or paraffin. A condenser so constructed does not accomplish the results attained by my condenser. In the first place, it is necessary, in order to exclude the moisture from the condenser, to impenetrate, with wax or the like, all the sheets of dielectric material. Varnished paper could not be so penetrated, and, moreover, cracking of the varnish cannot be avoided. Indeed, in my condenser, which involves the provision of a tight-gripping casing of deformable material, when the casing and its contents of conducting material and dielectric material are, as a unit, forcibly pressed to shape, the layers of varnish would be fatally ruptured in the process of compression. Moreover, the varnish itself does not alter the character of the paper, which is just as compressible as the unvarnished paper, while "hardness" is a quality of the film or varnish and not of the sheet of paper to which it is applied.

This application is a continuation in part of an application filed by me December 13, 1917, Serial No. 206,900, patent granted April 20, 1920, No. 1,337,505. I do not claim herein the means shown for maintaining the lead in place and preventing it from cutting the dielectric material, as the same forms the subject-matter of application Serial No. 206,900.

Having now fully described my invention, what I claim and desire to protect by Letters Patent is:

1. A dry condenser comprising layers of conducting material and layers of dielectric material, the latter consisting of layers of homogeneous material which are relatively inherently hard and incompressible and layers of relatively soft and compressible material of less weight than the harder and less compressible layers.

2. A dry condenser comprising conducting material alternating with dielectric material, the latter comprising a plurality of contacting layers of fibrous material of different degrees of hardness and compressibility, the harder and less compressible layers being of greater weight than the softer and more compressible layers.

3. A dry condenser comprising layers of conducting material alternating with layers of dielectric material, the latter comprising a plurality of contacting layers of wax-impregnated material of different degrees of hardness and compressibility.

4. A dry condenser comprising conducting material, dielectric material comprising layers of paper of different degrees of hardness and compressibility, and a tight-gripping casing of deformable material holding adjacent elements of the condenser in intimate relation, thus enabling the condenser to assume and retain its desired shape, avoiding the tendency to rupture under compression, giving capacity to withstand relatively high temperatures and overcoming the tendency to store.

5. A dry condenser comprising layers of conducting material, layers of fibrous dielectric material of different degrees of hardness and compressibility, the harder and less compressible layers being of greater weight than the softer and more compressible layers, and an inclosing tight-gripping casing compressing said layers in intimate inter-relation.

6. A dry condenser comprising layers of dielectric material and conducting material in which between each two most nearly adjacent layers of conducting material is arranged one layer of relatively hard and noncompressible paper and one layer of relatively soft and compressible paper; each layer of conducting material contacting on opposite sides with paper of different degrees of hardness and compressibility, and each layer of paper contacting on opposite sides with conducting material and paper of a different degree of hardness and compressibility.

In testimony of which invention, I have hereunto set my hand, at Philadelphia, Pa., on this 3rd day of October, 1918.

WILLIAM C. BRINTON, Jr.